US011256732B2

(12) United States Patent
Weiss et al.

(10) Patent No.: US 11,256,732 B2
(45) Date of Patent: Feb. 22, 2022

(54) FILE VALIDATION SUPPORTED BY MACHINE LEARNING

(71) Applicant: SAP SE, Walldorf (DE)

(72) Inventors: Klaus Weiss, Neulussheim (DE); Rui Gu, Oftersheim (DE)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 16/394,697

(22) Filed: Apr. 25, 2019

(65) Prior Publication Data

US 2020/0342012 A1    Oct. 29, 2020

(51) Int. Cl.
*G06F 16/332* (2019.01)
*G06N 20/00* (2019.01)

(52) U.S. Cl.
CPC ......... *G06F 16/3323* (2019.01); *G06N 20/00* (2019.01)

(58) Field of Classification Search
CPC .. G06F 16/3323; G06F 16/3346; G06N 20/00
See application file for complete search history.

(56) References Cited

U.S. PATENT DOCUMENTS

| | | | |
|---|---|---|---|
| 2003/0028512 A1* | 2/2003 | Stensmo | G06F 16/3325 |
| 2012/0278266 A1* | 11/2012 | Naslund | G06F 16/93 |
| | | | 706/45 |
| 2014/0095493 A1* | 4/2014 | Feuersanger | G06F 16/24578 |
| | | | 707/728 |
| 2018/0137107 A1* | 5/2018 | Buccapatnam Tirumala | ............... |
| | | | G06F 40/30 |
| 2018/0247227 A1* | 8/2018 | Holtham | G06K 9/6215 |
| 2018/0341875 A1* | 11/2018 | Carr | G06Q 10/101 |
| 2019/0065991 A1* | 2/2019 | Guggilla | G06N 20/00 |
| 2019/0377823 A1* | 12/2019 | Boquet | G06N 3/08 |

* cited by examiner

*Primary Examiner* — Grace Park
(74) *Attorney, Agent, or Firm* — Fountainhead Law Group P.C.

(57) ABSTRACT

Matching documents of a first kind (e.g., credit memos) to documents of a second kind (e.g., invoices) includes training a set of feature models and an all-features model. The set of feature models can be applied to unmatched documents of the first kind to produce predicted documents of the second kind. The predicted documents can be used to identify candidate documents as candidates to be matched to the unmatched documents.

20 Claims, 19 Drawing Sheets

| Credit Memo, 302 | Invoice, 304 |
| --- | --- |
| Company Code | Company Code |
| Sales Organization | Sales Organization |
| Distribution Channel | Distribution Channel |
| Division | Division |
| Document Category | Document Category |
| Billing Category | Billing Category |
| Billing Type | Billing Type |
| Shipping Conditions | Shipping Conditions |
| Sales District | Sales District |
| Country of Destination | Country of Destination |
| Region | Region |
| Plant | Plant |
| Storage | Storage |
| Sold-to Party ID | Sold-to Party ID |
| Ship-to Party ID | Ship-to Party ID |
| Bill-to Party ID | Bill-to Party ID |
| Sold-to Party Full Name | Sold-to Party Full Name |
| Ship-to Party Full Name | Ship-to Party Full Name |
| Bill-to Party Full Name | Bill-to Party Full Name |
| Sold-to Party Address | Sold-to Party Address |
| Ship-to Party Address | Ship-to Party Address |
| Bill-to Party Address | Bill-to Party Address |
| Posting Date | Posting Date |
| Document Date | Document Date |
| Material ID | Material ID |
| Material Group | Material Group |
| Material Type | Material Type |
| Material Description | Material Description |
| Quantity | Quantity |
| Amount | Amount |
| Currency | Currency |
| VAT Number | VAT Number |
| ... | ... |

(data fields, 306)

FIG. 3

| categorical features (credit memo) | | | categorical features (invoice) | | | |
|---|---|---|---|---|---|---|
| CM.F1 | CM.F2 | CM.F3 | INV.F1 | INV.F2 | INV.F3 | |
| A1 | B2 | C3 | L1 | M3 | N1 | Invoice1 |
|  |  |  | L3 | M2 | N3 | Invoice2 |
|  |  |  | L3 | M3 | N2 | Invoice3 |
| A3 | B1 | C2 | L2 | M2 | N1 | Invoice4 |
|  |  |  | L3 | M2 | N2 | Invoice5 |
|  |  |  | L1 | M1 | N3 | Invoice6 |
| A2 | B2 | C1 | L2 | M1 | N2 | Invoice7 |
|  |  |  | L3 | M2 | N3 | Invoice8 |
| A1 | B2 | C2 | L3 | M1 | N3 | Invoice9 |
|  |  |  | L1 | M2 | N1 | Invoice10 |
|  |  |  | L2 | M3 | N1 | Invoice11 |

Rows grouped as: CM1 (row 1), CM2 (rows 2–4), CM3 (rows 5–6), CM4 (rows 7–9).

FIG. 6 training set, 504b

| CM.F1 | CM.F2 | CM.F3 | INV.F2 |
|---|---|---|---|
| A1 | B2 | C3 | M3 |
| A1 | B2 | C3 | M2 |
| A1 | B2 | C3 | M3 |
|  |  |  |  |
| A3 | B1 | C2 | M2 |
| A3 | B1 | C2 | M2 |
| A3 | B1 | C2 | M1 |
|  |  |  |  |
| A2 | B2 | C1 | M1 |
| A2 | B2 | C1 | M2 |
|  |  |  |  |
| A1 | B2 | C2 | M1 |
| A1 | B2 | C2 | M2 |
| A1 | B2 | C2 | M3 |

FIG. 7B training set, 504c

| CM.F1 | CM.F2 | CM.F3 | INV.F3 |
|---|---|---|---|
| A1 | B2 | C3 | N1 |
| A1 | B2 | C3 | N3 |
| A1 | B2 | C3 | N2 |
|  |  |  |  |
| A3 | B1 | C2 | N1 |
| A3 | B1 | C2 | N2 |
| A3 | B1 | C2 | N3 |
|  |  |  |  |
| A2 | B2 | C1 | N2 |
| A2 | B2 | C1 | N3 |
|  |  |  |  |
| A1 | B2 | C2 | N3 |
| A1 | B2 | C2 | N1 |
| A1 | B2 | C2 | N1 |

FIG. 7C

| | CM.F1 | CM.F2 | CM.F3 | INV.F1 (predicted) | probability (%) |
|---|---|---|---|---|---|
| CM #9001 | A1 | B2 | C3 | L1 | 40 |
| | | | | L3 | 60 |
| CM #9002 | A3 | B1 | C2 | L2 | 70 |
| | | | | L1 | 60 |
| | | | | L3 | 60 |
| CM #9003 | A2 | B2 | C1 | L2 | 70 |
| | | | | L3 | 50 |
| CM #9004 | A1 | B2 | C2 | L3 | 40 |
| | | | | L1 | 60 |
| | | | | L2 | 50 |

FIG. 11A

| | CM.F1 | CM.F2 | CM.F3 | INV.F2 (predicted) | probability (%) |
|---|---|---|---|---|---|
| CM #9001 | A1 | B2 | C3 | M2 | 80 |
| | | | | M3 | 60 |
| CM #9002 | A3 | B1 | C2 | M1 | 75 |
| | | | | M2 | 40 |
| CM #9003 | A2 | B2 | C1 | M2 | 60 |
| | | | | M1 | 55 |
| CM #9004 | A1 | B2 | C2 | M3 | 40 |
| | | | | M1 | 65 |
| | | | | M2 | 50 |

FIG. 11B

| | CM.F1 | CM.F2 | CM.F3 | INV.F3 (predicted) | probability (%) |
|---|---|---|---|---|---|
| CM #9001 | A1 | B2 | C3 | N2 | 80 |
| | | | | N3 | 60 |
| | | | | N1 | 80 |
| CM #9002 | A3 | B1 | C2 | N1 | 75 |
| | | | | N2 | 40 |
| | | | | N3 | 60 |
| CM #9003 | A2 | B2 | C1 | N2 | 60 |
| | | | | N3 | 55 |
| CM #9004 | A1 | B2 | C2 | N3 | 40 |
| | | | | N1 | 65 |

FIG. 11C combination matrix, 1202 (predicted invoices)

| unmatched credit memo #9001 | | | | | |
|---|---|---|---|---|---|
| INV.F1 (predicted) | probability INV.F1 (%) | INV.F2 (predicted) | probability INV.F2 (%) | INV.F3 (predicted) | probability INV.F3 (%) |
| L1 | 40 | M2 | 80 | N2 | 80 |
| L1 | 40 | M2 | 80 | N3 | 60 |
| L1 | 40 | M2 | 80 | N1 | 80 |
| L1 | 40 | M3 | 60 | N2 | 80 |
| L1 | 40 | M3 | 60 | N3 | 60 |
| L1 | 40 | M3 | 60 | N1 | 80 |
| L3 | 60 | M2 | 80 | N2 | 80 |
| L3 | 60 | M2 | 80 | N3 | 60 |
| L3 | 60 | M2 | 80 | N1 | 80 |
| L3 | 60 | M3 | 60 | N2 | 80 |
| L3 | 60 | M3 | 60 | N3 | 60 |
| L3 | 60 | M3 | 60 | N1 | 80 |

1204a, 1204b, 1204c — valid predicted invoices

FIG. 12A combination matrix, 1212 (predicted invoices)

| unmatched credit memo #9002 | | | | | |
|---|---|---|---|---|---|
| INV.F1 (predicted) | probability INV.F1 (%) | INV.F2 (predicted) | probability INV.F2 (%) | INV.F3 (predicted) | probability INV.F3 (%) |
| L2 | 70 | M1 | 75 | N1 | 75 |
| L2 | 70 | M1 | 75 | N2 | 40 |
| L2 | 70 | M1 | 75 | N3 | 60 |
| L2 | 70 | M2 | 40 | N1 | 75 |
| L2 | 70 | M2 | 40 | N2 | 40 |
| L2 | 70 | M2 | 40 | N3 | 60 |
| L1 | 60 | M1 | 75 | N1 | 75 |
| L1 | 60 | M1 | 75 | N2 | 40 |
| L1 | 60 | M1 | 75 | N3 | 60 |
| L1 | 60 | M2 | 40 | N1 | 75 |
| L1 | 60 | M2 | 40 | N2 | 40 |
| L1 | 60 | M2 | 40 | N3 | 60 |
| L3 | 60 | M1 | 75 | N1 | 75 |
| L3 | 60 | M1 | 75 | N2 | 40 |
| L3 | 60 | M1 | 75 | N3 | 60 |
| L3 | 60 | M2 | 40 | N1 | 75 |
| L3 | 60 | M2 | 40 | N2 | 40 |
| L3 | 60 | M2 | 40 | N3 | 60 |

1214a, 1214b, 1214c — valid predicted invoices

FIG. 12B combination matrix, 1222 (predicted invoices)

unmatched credit memo #9003

| INV.F1 (predicted) | probability INV.F1 (%) | INV.F2 (predicted) | probability INV.F2 (%) | INV.F3 (predicted) | probability INV.F3 (%) |
|---|---|---|---|---|---|
| L2 | 70 | M2 | 60 | N2 | 60 |
| L2 | 70 | M2 | 60 | N3 | 55 |
| L2 | 70 | M1 | 55 | N2 | 60 |
| L2 | 70 | M1 | 55 | N3 | 55 |
| L3 | 50 | M2 | 60 | N2 | 60 |
| L3 | 50 | M2 | 60 | N3 | 55 |
| L3 | 50 | M1 | 55 | N2 | 60 |
| L3 | 50 | M1 | 55 | N3 | 55 |

1224a (rows 3–4), 1224b (rows 5–6)

valid predicted invoices

FIG. 12C combination matrix, 1232 (predicted invoices)

unmatched credit memo #9004

| INV.F1 (predicted) | probability INV.F1 (%) | INV.F2 (predicted) | probability INV.F2 (%) | INV.F3 (predicted) | probability INV.F3 (%) |
|---|---|---|---|---|---|
| L3 | 40 | M3 | 40 | N3 | 75 |
| L3 | 40 | M3 | 40 | N1 | 40 |
| L3 | 40 | M1 | 65 | N3 | 60 |
| L3 | 40 | M1 | 65 | N1 | 75 |
| L3 | 40 | M2 | 50 | N3 | 40 |
| L3 | 40 | M2 | 50 | N1 | 60 |
| L1 | 60 | M3 | 40 | N3 | 75 |
| L1 | 60 | M3 | 40 | N1 | 40 |
| L1 | 60 | M1 | 65 | N3 | 60 |
| L1 | 60 | M1 | 65 | N1 | 75 |
| L1 | 60 | M2 | 50 | N3 | 40 |
| L1 | 60 | M2 | 50 | N1 | 60 |
| L2 | 50 | M3 | 40 | N3 | 75 |
| L2 | 50 | M3 | 40 | N1 | 40 |
| L2 | 50 | M1 | 65 | N3 | 60 |
| L2 | 50 | M1 | 65 | N1 | 75 |
| L2 | 50 | M2 | 50 | N3 | 40 |
| L2 | 50 | M2 | 50 | N1 | 60 |

1234a (rows 3–4), 1234b (row 12), 1234c (rows 13–14)

valid predicted invoices

FIG. 12D

| unmatched credit memo | candidate invoice# | INV.F1 | probability (%) | INV.F2 | probability (%) | INV.F3 | probability (%) | |
|---|---|---|---|---|---|---|---|---|
| CM #9001 | 3001 | L1 | 40 | M3 | 60 | N2 | 80 | ⎫ candidate invoices, 1502 |
| | 3002 | L1 | 40 | M3 | 60 | N2 | 80 | |
| | 3003 | L1 | 40 | M3 | 60 | N1 | 80 | |
| | 3004 | L3 | 60 | M2 | 80 | N3 | 60 | |
| | 3005 | L3 | 60 | M2 | 80 | N3 | 60 | ⎭ |
| CM #9002 | 30011 | L2 | 70 | M2 | 40 | N1 | 75 | ⎫ candidate invoices, 1504 |
| | 30012 | L2 | 70 | M2 | 40 | N1 | 75 | |
| | 30013 | L2 | 70 | M2 | 40 | N1 | 75 | |
| | 30014 | L3 | 60 | M2 | 40 | N2 | 40 | ⎭ |
| CM #9003 | 30021 | L2 | 70 | M1 | 55 | N2 | 60 | ⎫ candidate invoices, 1506 |
| | 30022 | L2 | 70 | M1 | 55 | N2 | 60 | |
| | 30023 | L2 | 70 | M1 | 55 | N2 | 60 | |
| | 30024 | L3 | 60 | M1 | 55 | N2 | 60 | ⎭ |
| CM #9004 | 30031 | L3 | 40 | M1 | 65 | N3 | 40 | ⎫ candidate invoices, 1508 |
| | 30032 | L2 | 50 | M3 | 40 | N1 | 65 | ⎭ |

FIG. 15

| unmatched credit memo | candidate invoice # | INV.F1 | probability (%) | INV.F2 | probability (%) | INV.F3 | probability (%) | similarity C1 (%) | similarity C2 (%) | K-means (%) |
|---|---|---|---|---|---|---|---|---|---|---|
| CM #9001 | 3001 | L1 | 40 | M3 | 60 | N2 | 80 | 85 | 50 | 63 |
| | 3002 | L1 | 40 | M3 | 60 | N2 | 80 | 35 | 70 | 57 |
| | 3003 | L1 | 40 | M3 | 60 | N1 | 80 | 80 | 90 | 70 |
| | 3004 | L3 | 60 | M2 | 80 | N3 | 60 | 90 | 70 | 72 |
| | 3005 | L3 | 60 | M2 | 80 | N3 | 60 | 100 | 85 | 77 |
| CM #9002 | 30011 | L2 | 70 | M2 | 40 | N1 | 75 | 70 | 85 | 68 |
| | 30012 | L2 | 70 | M2 | 40 | N1 | 75 | 90 | 60 | 73 |
| | 30013 | L2 | 70 | M2 | 40 | N1 | 75 | 70 | 90 | 69 |
| | 30014 | L3 | 60 | M2 | 40 | N2 | 40 | 85 | 50 | 61 |
| CM #9003 | 30021 | L2 | 70 | M1 | 55 | N2 | 60 | 75 | 75 | 67 |
| | 30022 | L2 | 70 | M1 | 55 | N2 | 60 | 90 | 90 | 73 |
| | 30023 | L2 | 70 | M1 | 55 | N2 | 60 | 85 | 75 | 69 |
| | 30024 | L3 | 60 | M1 | 55 | N2 | 60 | 40 | 90 | 63 |
| CM #9004 | 30031 | L3 | 40 | M1 | 65 | N3 | 40 | 90 | 85 | 64 |
| | 30032 | L2 | 50 | M3 | 40 | N1 | 65 | 50 | 100 | 61 |

FILE VALIDATION SUPPORTED BY MACHINE LEARNING

BACKGROUND

The present disclosure is directed to file validation using machine learning, and in particular to clearing account documents. A clearing account is a general ledger account that is used to temporarily aggregate the amounts being transferred from other temporary accounts. An example is the income summary account, to which the ending balances of all revenue and expense accounts are transferred at the end of a fiscal year before the aggregate balance is shifted to retained earnings. Another example is a payroll system, where a payroll clearing account should be a zero-balance account. Just after the payments are tallied, before they are issued to employees, payroll funds are transferred into the clearing account. When they are cashed, the account reverts to zero and all the payments are registered.

It is important to properly maintain a clearing account, primarily from the enterprise's financial health, but also in terms of auditing and taxing purposes. For example, the Standard Audit File for Tax (SAF-T) is an international standard for electronic exchange of reliable accounting data from organizations to a national tax authority or external auditors. In various jurisdictions, SAF-T files are required to be submitted monthly or on a yearly basis.

The SAF-T file is based on a predefined format, namely the Extended Markup Language (XML). Due to the large amount of data that is required, the SAF-T file is typically created in a two-step approach. In a first step, data from relevant business areas (accounting, material management, sales, etc. of the organization are collected and extracted to a data base table. In a second step, the SAF-T XML file is generated. Before the file is submitted to the tax authorities, a verification process can be performed on the file(s) before being submitted to the tax authorities to confirm that all formal SAF-T requirements are met (in terms of format and structure of the file) and the content (substance) of the file is correct and VAT-compliant. For an organization, it is important that the content of file be internally consistent and that the content is VAT-compliant. Inconsistencies and errors can raise flags, which can lead to unnecessary delays. One challenging area is in the correctness of clearing accounts, where transactions must be correctly matched in order that accounts are balanced.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 illustrates examples of an invoice document and a credit memo used as illustrative examples in the description of embodiments in accordance with the present disclosure.

FIG. 6 is an example of matched pairs of credit memos and invoices used in the description.

FIGS. 7A, 7B, 7C are examples of training data used to train feature models in accordance with some embodiments of the present disclosure.

FIGS. 11A, 11B, 11C are examples of generating predicted invoice feature values in accordance with some embodiments of the present disclosure.

FIG. 12A, 12B, 12C, 12D are examples of generating predicted invoices in accordance with some embodiments of the present disclosure.

FIG. 15 shows an example of candidate invoices generated for a set of unmatched credit memos in accordance with some embodiments of the present disclosure.

FIG. 16 illustrates an example of ranking the candidate invoices in accordance with some embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
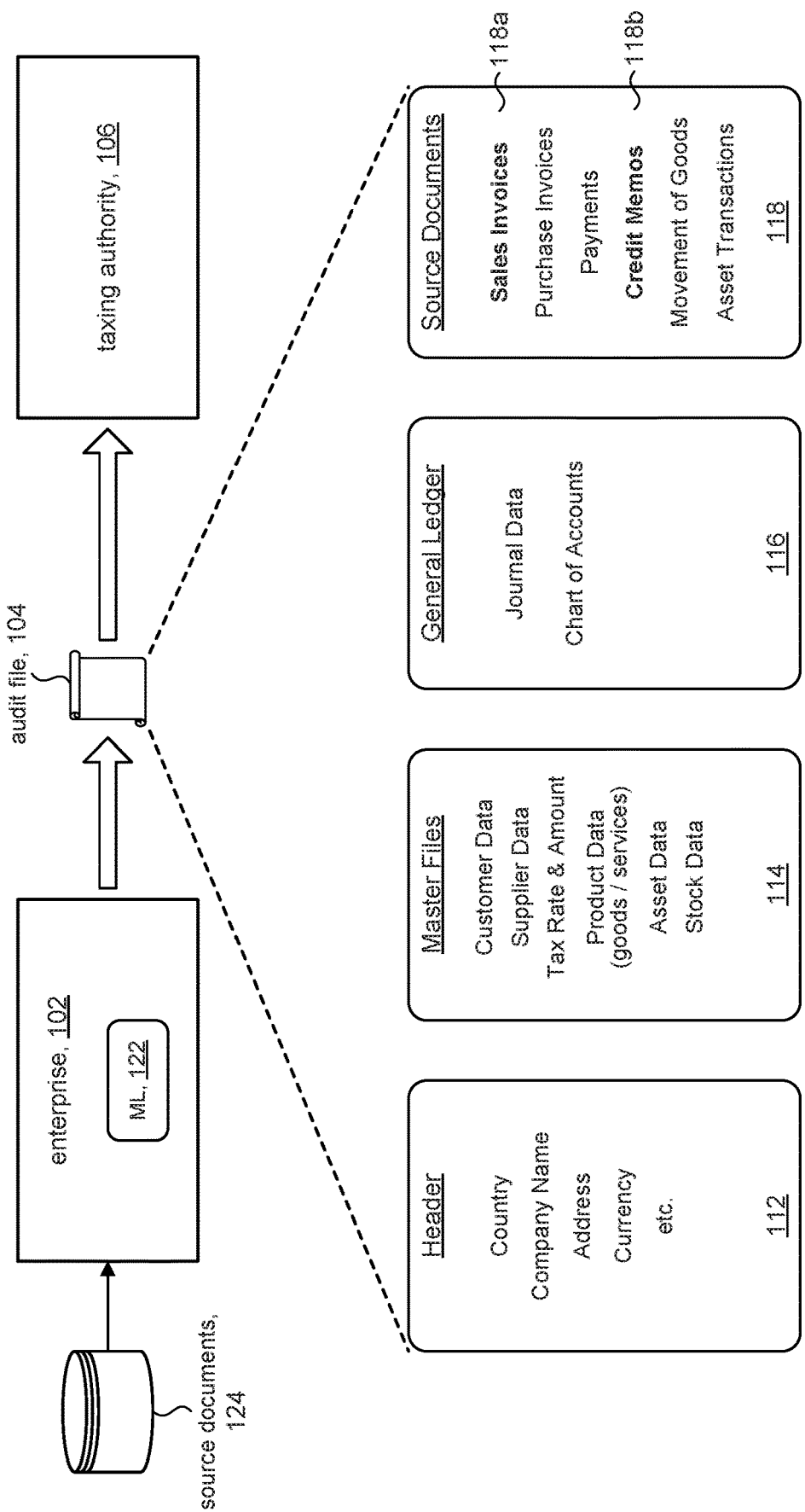
FIG. 1 is a high level illustration that shows an embodiment of the present disclosure.

FIG. 1 shows an enterprise or organization 102 configured to generate an audit file 104 in accordance with the present disclosure for submission to a taxing authority 106. In some embodiments, for example, the audit file 104 can conform to the Standard Audit File for Tax (SAF-T) standard. SAF-T is an international standard for electronic exchange of accounting data from an enterprise to a tax authority or auditors. The audit file 104 can be expressed using Extensible Markup Language (XML).

The audit file 104 can include a Header portion 112 that contains information about the enterprise 102 such as its country, name, location, and so on. A Master Files portion 114 can include information about the enterprise's customers, suppliers, products, financial data such as assets, stocks, and the like. A General Ledger portion 116 can include data that represents the record-keeping system for the enterprise's financial data such as journals (debit and credit account records), chart of accounts, and the like. A Source Documents portion 118 can include data that include the documents that record the transactions conducted by the enterprise 102 which reflect the enterprise's flow of cash and assets. Source documents include sales receipts, purchase orders, payments, credit memos, and the like.

The audit file 104 for enterprise 102 can be very large, especially for a globalized organization. It is important that the audit file 104 be verified/validated by the enterprise 102 before being submitted to the taxing authority 106. Errors can translate to reporting delays, incorrect assessment of taxes, and possible fines levied on the enterprise 102. Manual validation of the audit file 104 can be time consuming and labor intensive.

The validity of the data in the audit file 104 depends on the data in the source documents 124 used to generate the audit file. For example, if data is missing among the source documents 124, then corresponding content will also be missing in the audit file 104. If certain data in the source documents 124 is incorrect, such data and data computed from such data will also be wrong in the audit file 104.

If a content error is detected in the audit file 104, the error must be resolved manually. This can entail reviewing the source documents to find and resolve the error, and regenerating the audit file 104. The audit file 104 can contain tax relevant data for a certain period (month or year). In a large enterprise, such data can be many hundreds of thousands lines and may have a size of several GB. In large enterprises, it can take several days to resolve all errors so that the audit file 104 can be submitted to the tax authority 106.

In accordance with the present disclosure, the enterprise 102 can include a machine learning component 122 to facilitate the generation of a valid audit file 104. A common error encountered in the source documents 124 used to generate audit file 104 relates to the matching of invoices 118*a* and credit memos 118*b*, which can slow down the clearing process. When the enterprise issues an invoice (e.g., a sales invoice) 118*a* to its customer, a credit memo 118*b* may be subsequently issued. The credit memo should be matched to the invoice in order to properly offset the invoice amount. It is common that credit memos are not matched to their corresponding invoices because they do not contain a reference to the corresponding invoice. Unmatched credit memos can slow down the process of generating the audit file 104 because they have to be resolved. Unresolved unmatched credit memos can to incorrect audit data in the audit file 104.

FIG. 1 uses tax auditing, and in particular the SAF-T standard, to provide a concrete example of an environment that involves clearing accounts. It will be appreciated from the remaining discussion, however, that the present disclosure has applicability to any situation that involves clearing accounts, where documents involved in transferring assets need to be matched up.

Figure 2:
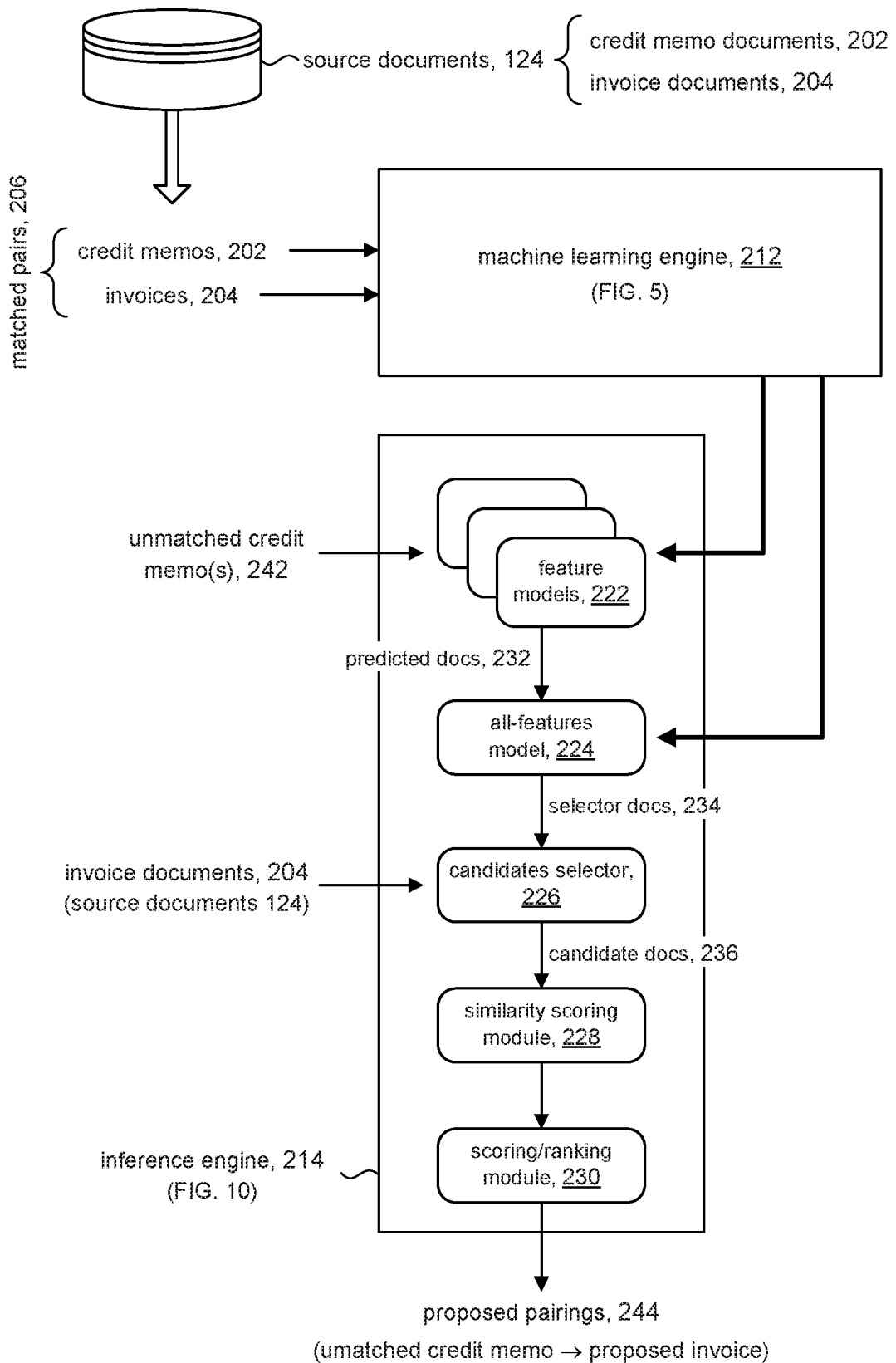
FIG. 2 is a high level illustration of a machine learning component in accordance with some embodiments of the present disclosure.

Referring to FIG. 2, the source documents 124 can include many kinds of documents, including credit memo documents 202 and invoice documents 204. An invoice 204 is a document issued by enterprise 102 (seller) to a customer (buyer) that lists goods sent or services provided by the enterprise, with a statement of the sum due for the goods/services. A credit memo 202 is a document issued by the enterprise 102 to a customer to reducing the amount that the customer owes under the terms of an earlier invoice 204. A credit memo 202 may be issued because the customer returned some or all the goods, or there was a pricing dispute, a marketing allowance, or other reasons under which the customer does not have to pay the full amount of the matching invoice 204.

A credit memo 202 can be matched to several invoices 204. For example, if a customer purchases 100 widgets, an invoice can be issued for that purchase. If the same customer subsequently purchases another 200 widgets, then a second invoice can be issued for the subsequent purchase. Suppose, the customer later returns 50 widgets for some reason, a credit memo can be issued for the price of the 50 widgets. From an accounting point of view, it does not matter which invoice is credited and so the credit memo can be matched to either the initial invoice or to the subsequent invoice.

A credit memo 202 is said to be "matched" to an earlier invoice 204 because the amount of reduction specified in the credit memo relates back to the amount in the earlier invoice. More generally, a document A of a first kind (e.g., a credit memo) can be deemed to be matched to a document B of a second kind (e.g., an invoice), if document A refers to some quantity (e.g., amount owed) specified in document B and serves to adjust (give reduce the amount owed) the quantity in document B.

FIG. 2 illustrates some high level details of the machine learning component 122 in enterprise 102 in accordance with the present disclosure. In some embodiments, for example, machine learning component 122 can include a machine learning engine 212. The machine learning engine 212 can be trained using matched pairs 206 of credit memos 202 and invoices 204, which can be obtained from source documents 124. As explained in more detail below, training data sets can be derived from the matched pairs 206 to train the machine learning engine 212. In accordance with the present disclosure, the machine learning engine 212 can generate a set of feature models 222 and an all-features model 224. As will be explained in more detail below, there is one feature model 222 for each feature associated with the second kind of documents (e.g., invoices 204). The all-features model 224 models the combined features associated with the first and second kinds of documents of (e.g., credit memos 202 and invoices 204).

In accordance with the present disclosure, the machine learning component 122 includes an inference engine 214 that receives as input one or more new or already existing unmatched credit memos 242. The inference engine 214 operates to identify one or more invoices from among the invoice documents 204 in source documents 124 as being a match to the received credit memos. In some embodiments, for example, the inference engine 214 incorporates the set of feature models 222 and the all-features model 224 generated by machine learning engine 212. The inference engine 214 can use the set of feature models 222 to produce one or more predicted invoice documents 232 from the received unmatched credit memos 242. The all-features model 224 can be applied to the predicted invoice documents 232 to produce one or more selector documents 234. A candidates selector 226 can use the selector documents 234 to select one or more candidate invoice documents 236 from the existing invoice documents 204 in source documents 124. A similarity scoring module 228 can computer similarity scores for the candidate documents. A scoring/ranking module 230 can be applied to the candidate invoice documents 236 to identify proposed pairings 244, comprising invoices from among the candidate invoice documents that are deemed to match the received unmatched credit memos 242, for example, by scoring the candidate invoice documents 236 and ranking the scored documents.

The discussion will now turn a more detailed discussion of machine learning engine 212 and inference engine 214 in accordance with some embodiments of the present disclosure. The description will use credit memos and invoices to illustrate the discussion. It will be appreciated, however, that in general the present disclosure can be applied to documents of a first kind, such as credit memos, that need to be matched to a documents of a second kind as invoices.

FIG. 3 illustrates an example of data fields 306 that credit memos 302 and invoices 304 may include. Some data fields hold continuous data such as price, quantity, and the like, other data fields hold categorical data such as company code, country, currency (dollars, euros, yen, etc.), material type, and the like. Such data can be referred to as the raw data.

Figure 4:
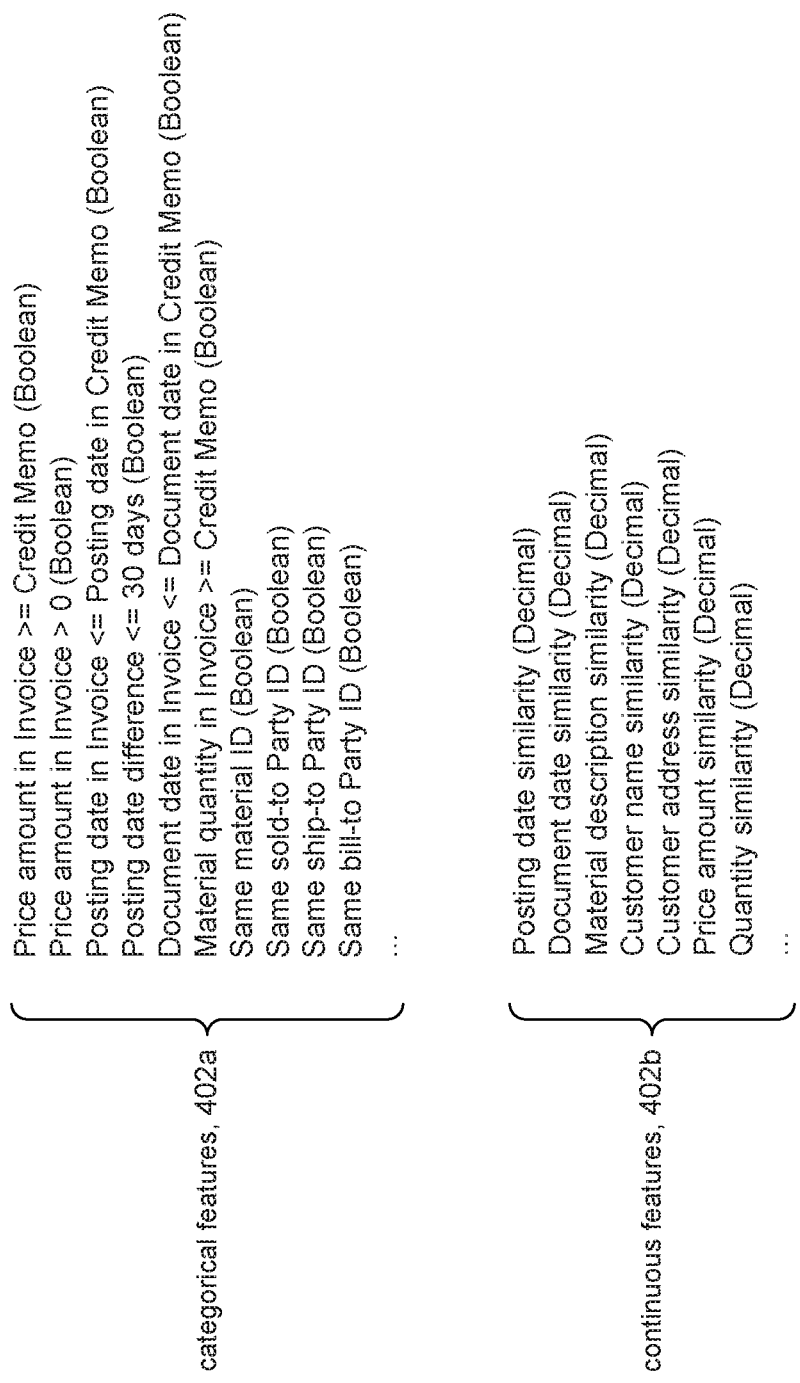
FIG. 4 illustrates an example of additional features that can be derived from invoices and credit memos.

Features are used for training the feature models 222 and the all-features model 224. Features are descriptive attributes of the data being modeled. Features can be identified from the data fields 306 of credit memos 302 and invoice 304. In some instances, the data fields 306 themselves can serves as features (e.g., company code, country, currency, etc.) and in other instances, features can be derived from the data fields. FIG. 4 illustrates an example of additional (new) features 402a, 402b that can be derived from the data fields 306 of the credit memos 302 and invoices 304, and can include categorical features 402a and continuous features 402b.

Figure 5:
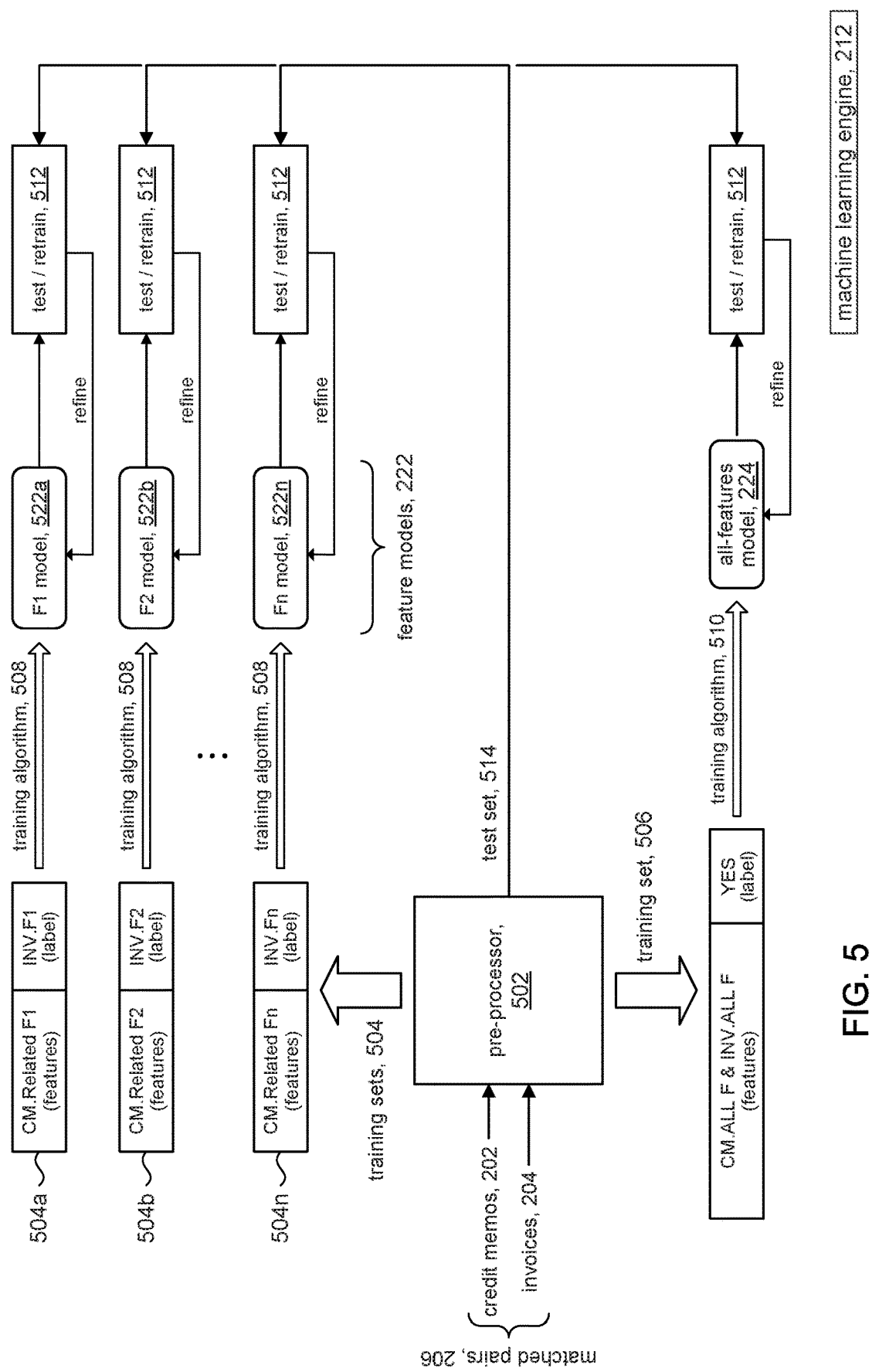
FIG. 5 is a high level block diagram of a machine learning engine in accordance with some embodiments of the present disclosure.

FIG. 5 is a block diagram representation of details of machine learning engine 212 (FIG. 2) in accordance with some embodiments of the present disclosure. Inputs to the machine learning engine 212 include matched pairs 206 comprising credit memos 202 matched with invoices 204. As explained above, a credit memo may be matched to more than one invoice.

In some embodiments, the machine learning engine 212 can include a pre-processor 502 to pre-process the matched pairs 206. For example, more data can result in longer running times for a training algorithm and larger computational and memory requirements. The pre-processor 502 can perform random distribution sampling to reduce the number of matched pairs 206 if needed. Random distribution sampling can be used to partition the matched pairs 206 into one set for training (the training set) and another set for testing (the test set). The pre-processor 502 can detect and correct for missing values using any suitable technique such as substitution with computed average or median values. The pre-processor 502 can create new features (e.g., FIG. 4) from the existing data, and so on.

Referring for a moment to FIG. 6, the figures shows an example of matched pairs 206 of credit memos and invoices that have been pre-processed in accordance with some embodiments of the present disclosure in preparation for training the machine learning engine 212. The figure shows four credit memos CM1, CM2, CM3, CM4. In this example, credit memo CM1 is matched to three invoices Invoice1, Invoice2, Invoice3; the matched pairs include (CM1, Invoice1), (CM1, Invoice2), (CM1, Invoice3). Likewise, CM2 is matched to Invoice4, Invoice5, Invoice6 to define matched pairs (CM2, Invoice4), (CM2, Invoice5), (CM2, Invoice6), and so on with CM3 and CM4. Although not depicted in this example, it will be appreciated that some credit memos may only have on matching invoice.

FIG. 6 shows an example of features associated with credit memos, namely CM.F1, CM.F2, CM.F3, and their respective feature values. For example, A1, B2, C3 are feature values for credit memo CM1; A3, B1, C2 are feature values for CM2; and so on. Likewise, the features associated with invoices include INV.F1, INV.F2, . . . INV.F3, and their respective feature values. For example, L1, M3, N1 are feature values for Invoice1; L3, M2, N3 are feature values for Invoice2; and so on. Suppose, for example, a feature (e.g., CM.F1) is "currency" then feature values can be categorical values such as "dollars," "euros," "yen," etc. If a feature is "material type" then feature values can be categorical values such as "aluminum," "carbon steel," "stainless steel," etc; and likewise for other features.

Continuing with the discussion of FIG. 5, in accordance with some embodiments of the present disclosure, machine learning engine 212 trains to kinds of models: feature models 222 and all-feature models 224. In some embodiments, the pre-processor 502 can generate training sets 504, 506 from the input data sets (matched pairs 206) to train the models 222, 224. Each training set comprises several vector pairs, each vector pair in turn comprises an input vector of features and a corresponding output vector of one or more labels. Each vector pair corresponds to a credit memo and matching invoice.

Training sets 504 are used to train the feature models 222. In accordance with some embodiments, the feature models 222 include a respective feature model 522a, 522b, . . . 522n for each feature INV.F1, INV.F2, . . . INV.Fn that is associated with invoice documents. What constitutes a feature for any given kind of document (e.g., credit memo, invoice, etc.) depends on the nature of the document, the data comprising the document, and so on. For example, currency units (e.g., dollar, euro, etc.) can be deemed to be a feature of invoice documents, sale location can be another feature of invoice documents, and so on. Accordingly, the feature model 522a can correspond to the currency feature, feature model 522b can correspond to the sale location feature, and so on. Each feature model 522a, 522b, . . . 522n can be trained with a corresponding training set 504a, 504b, . . . 504n.

Figure 7A:
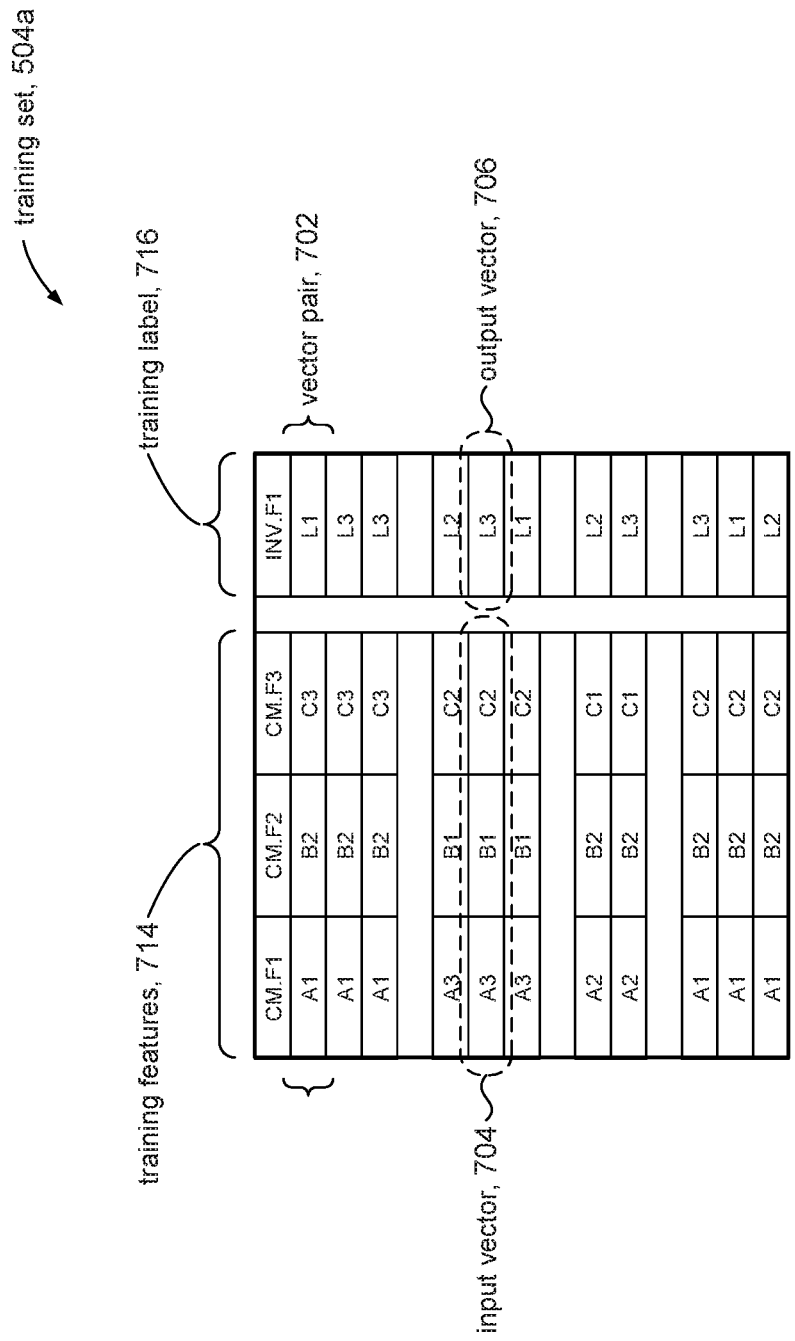

Training set 504a is shown in FIG. 7A comprising vector pairs 702, where the input vector 704 comprises feature values of the credit memo features (training features, 714) and the output vector 706 comprises a feature value of one of the invoice features (training label, 716). The training set 504a can train the machine learning engine 212 for invoice feature INV.F1. Accordingly, each vector pair 702 in training set 504a comprises feature values of the credit memo features paired with values for invoice feature INV.F1. Corresponding trainings sets 504b (for invoice feature INV.F2) and 504c (for invoice feature INV.F3) are shown in FIGS. 7B and 7C, respectively.

Continuing with the discussion of FIG. 5, the training sets 504 feed into training algorithms 508. Each training set 504a, 504b, . . . 504n serves to train its respective feature model 522a, 522b, . . . 522n. The feature model is run with its corresponding training set and produces a result, which is then compared with the output for each input vector. Based on the result of the comparison and the specific learning algorithm being used, the parameters of the model are adjusted. In some embodiments, for example, the training algorithm 508 can be a multi-class classification algorithm, such as multi-class logistic regression. Multi-class logistic regression is a classification method that generalizes logistic regression to multiple-class problems, i.e. with more than two possible discrete outcomes. A multi-class logistic regression model is used to predict the probabilities of the different possible outcomes of a categorically distributed dependent variable, given a set of independent variables.

Figure 8:
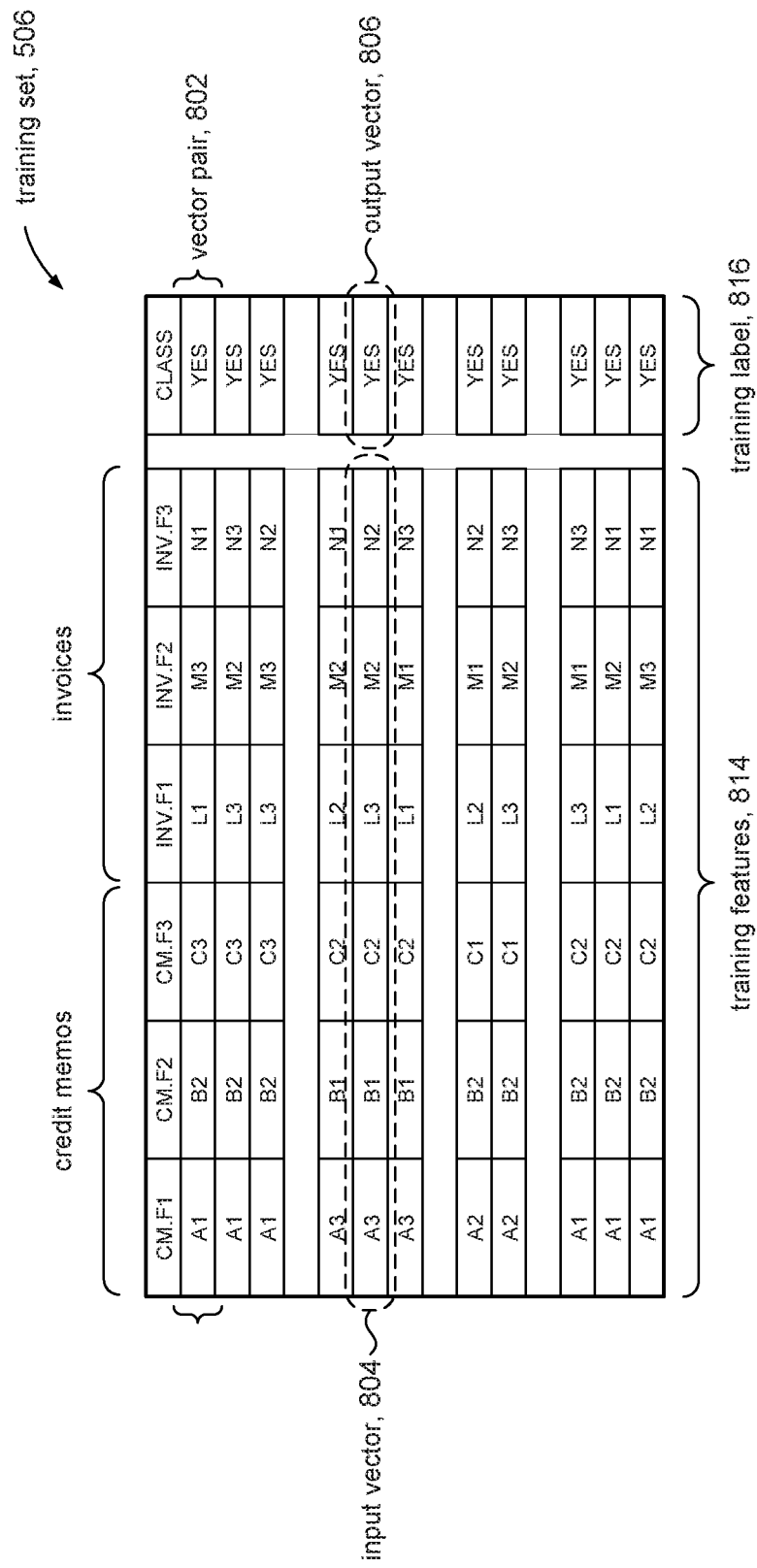
FIG. 8 is an example of training data used to train an all-features model in accordance with some embodiments of the present disclosure.

Referring to FIGS. 5 and 8, the training set 506 is used to train the all-features model 224. In accordance with some embodiments, each vector pair 802 in training set 506 corresponds to a credit memo and a matching invoice, where the input vector 804 comprises features (training features 814) associated with both credit memos and invoices. The output vector 806 is a single YES label (training label 816). The training set 506 feeds into training algorithm 510, which in some embodiments can be a one-class classification algorithm such as a one-class support vector machine (SVM), to learn one or more constellation frontiers from the training set 506 (e.g., FIG. 13). The all-features model 224 treats the training set of matched pairs of credit memos and invoices as a single class (e.g., identified by the YES label) and can test whether new observations are alike or not like the training set. This aspect of the present disclosure is discussed in more detail below.

The machine learning engine 212 can include corresponding testing and retraining modules 512 for the feature models 222 and the all-features model 224 to refine the parameters of the models. In some embodiments, for example, the pre-processor 502 can generate a test set 514 from the incoming matched pairs 206 for testing the models 222, 224.

Figure 9:
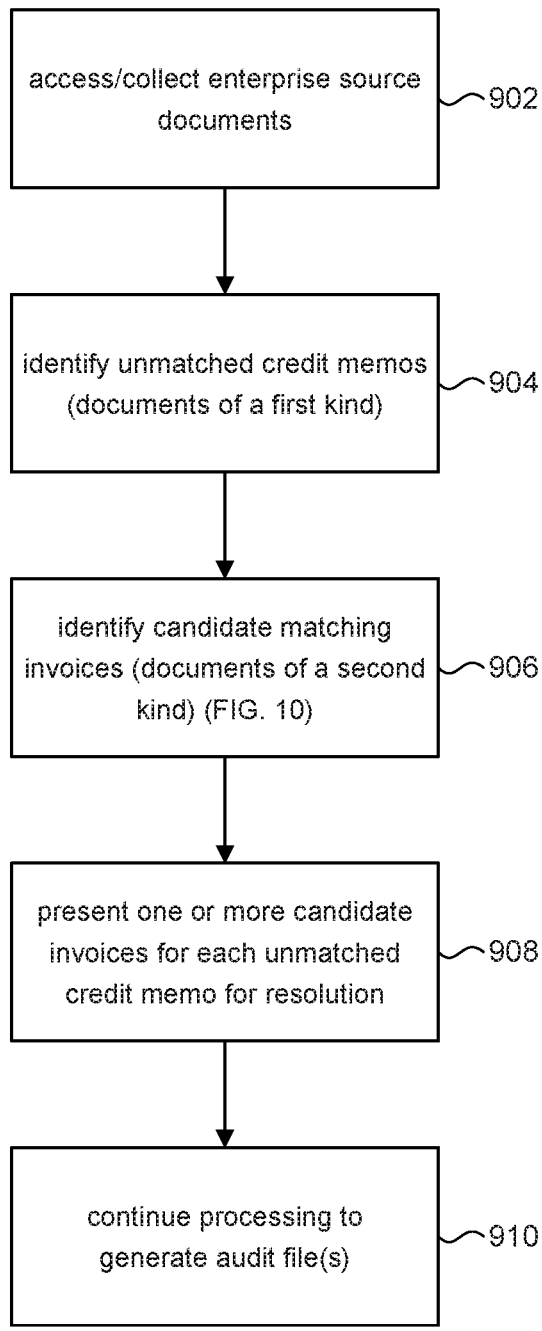
FIG. 9 is a high level flow diagram for generating audit files in accordance with some embodiments of the present disclosure.

Referring to FIG. 9, the discussion will now turn to a high level description of processing in the enterprise (e.g., 102) for generating an audit file (e.g., 104) in accordance with the present disclosure. In some embodiments, for example, enterprise 102 may include computer executable program code, which when executed by a processor (e.g., 1702, FIG. 17), can cause the processor to perform processing in accordance with FIG. 9. The flow of operations performed by the processor is not necessarily limited to the order of operations shown.

An audit file 104 can be generated to conform to periodic reporting requirements by a taxing authority (e.g., 106). Administrative personnel can initiate a file creation process to generate the audit file 104. In some instances, an audit file 104 may be generated during the course of business by the enterprise 104, e.g., to perform a financial assessment, in response to an audit, and so on. In some embodiments, the file creation process to generate audit file 104 can begin at operation 902.

At operation 902, enterprise 102 can access the enterprise's source documents (e.g., 124) to begin gathering and collecting the raw data from which to generate the audit file 104. The remaining description of operations in FIG. 9 will use credit memos and invoices as a specific example. It will be appreciated, however, that in general the operations are applicable to documents of a first kind (such as credit memos) that need to be matched to documents of a second kind (such as invoices).

At operation 904, enterprise 102 can identify unmatched credit memos (e.g., 242) from among the data collected from source documents 124. For example, the credit memos 242 can be deemed to be "unmatched" if they do not have sufficient information to identify their corresponding invoices, and thus cannot be cleared.

At operation 906, enterprise 102 can identify candidate invoices (e.g., 236) from source documents 124 that are deemed to match the credit memos 242 identified in operation 904. In some embodiments, as illustrated in FIG. 2 for example, each unmatched credit memo 242 can be processed by inference engine 214 to identify one or more candidate invoices 236. Operation details of inference engine 214 are discussed below.

At operation 908, enterprise 102 can present proposed pairings (e.g., 244) of unmatched credit memos and candidate invoices and for resolution. In some embodiments, for example, a suitable user interface (UI, not shown) can be provided to present an unmatched credit memo along with one or more corresponding candidate invoices to a user. In some embodiments, for example, the UI can present the "best" pairing of the unmatched credit memo to a candidate invoice for a YES/NO decision from the user. In other embodiments, the UI can present a list of the top n pairings of credit memo and candidate invoices to the user. Processing in accordance with the present disclosure can significantly improve the clearing process because the user does not have to manually identify invoices from the source documents 124, which can number in the hundreds to thousands of invoices in a large enterprise, thus saving considerable time during the file creation process.

At operation 910, enterprise 102 can proceed with the process of generating the audit file 104. While generating an audit file 104 can entail many steps, embodiments of the present disclosure can at least facilitate the clearing process portion of the whole process.

Figure 10:
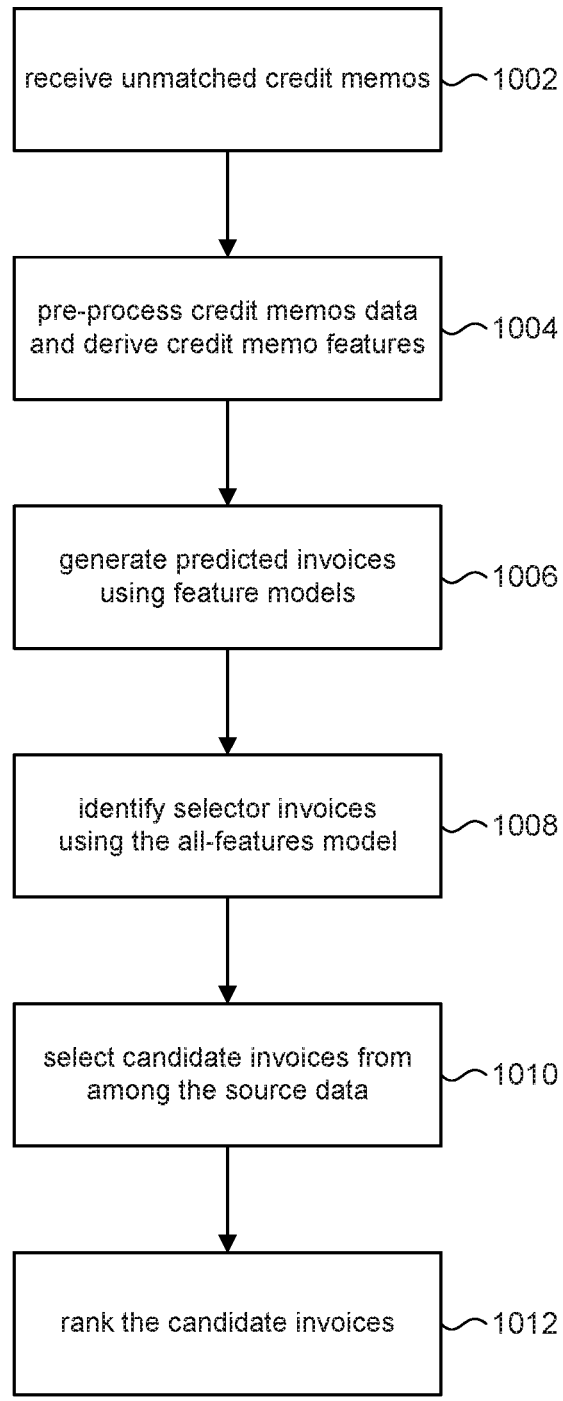
FIG. 10 is a high level flow diagram for matching unmatched credit memos to invoices in accordance with some embodiments of the present disclosure.

Referring to FIG. 10 the discussion will now turn to a high level description of processing in the inference engine (e.g., 214) in accordance with the present disclosure. In some embodiments, for example, enterprise 102 may include computer executable program code, which when executed by a processor (e.g., 1702, FIG. 17), can cause the processor to perform processing in accordance with FIG. 10. The flow of operations performed by the processor is not necessarily limited to the order of operations shown. It will be appreciated that in general the operations are applicable to documents of a first kind (such as credit memos) that need to be matched to documents of a second kind (such as invoices).

The following operations receive unmatched credit memos, which have no reference to their matching invoice, and identify possible matching invoices.

Operation 1002

At operation 1002, inference engine 214 can receive one or more unmatched credit memos (e.g., 242).

Operation 1004

At operation 1004, inference engine 214 can pre-process data comprising the received credit memos 242. For example, the inference engine 214 can detect and substitute missing values, create new features from data contained in the received credit memos, and so on.

Operation 1006

At operation 1006, inference engine 214 can generate a set of predicted invoices (e.g., predicted documents 232) from the values of features associated with the received credit memos. In some embodiments, for example, the inference engine 214 can first determine predicted invoice feature values for each invoice feature (INV.F1, INV.F2, . . . INV.Fn) by applying data from the received credit memos to the corresponding feature models (e.g., 522a, 522b, . . . 522n, FIG. 5).

FIG. 11A, for example, shows four unmatched credit memos, CM #9001, CM #9002, CM #9003, CM #9004. The feature values for CM #9001 are A1, B2, C3, the feature values for CM #9002 are A3, B1, C2, and so on for CM #9003 and CM #9004. In accordance with the present disclosure, the feature values of an unmatched credit memo (e.g., CM #9001) can be applied to each feature model 522a, 522b, . . . 522n to generate predicted feature values for respective invoice features INV.F1, INV.F2, . . . INV.Fn. A feature model (e.g., 522a) in accordance with the present disclosure can generate one or more predicted feature values and corresponding probability scores for its respective invoice feature (e.g., INV.F1).

In some embodiments, each feature model can be a multi-class logistic regression model. For example, in the standard multi-class logical regression mathematical formula, let P and K be the number of features and number of labels, respectively.

In the training set, let N be the number of samples, $X \in R^{N \times P}$ be the features where $X_{i,p}$ is the $p^{th}$ feature of the $i^{th}$ sample, and $y \in R^N$ be the labels where $y_i \in \{1, 2, \ldots, K\}$ is the label of the $i^{th}$ sample. The output of the training phase is denoted as $W^* \in R^{(P+1) \times K}$, where $W^*_{p,k}$ ($p \leq P$) corresponds the weight of the $p^{th}$ feature for the $k^{th}$ class, and $W^*_{p+1,k}$ corresponds the constant for the $k^{th}$ class. $W^*$ is obtained by solving the following optimization problem:

$$w^* = \underset{W}{\mathrm{argmax}} \prod_i \frac{\sum_k l(y_i = k)\exp(X_{i,p}W_{p,k} + W_{P+1,k})}{\sum_k \exp(X_{i,p}W_{p,k} + W_{P+1,k})}$$

$$\text{s.t. } W_{P,K} = 0$$

In the inference set, let $\tilde{N}$ be the number of samples, $\tilde{x} \in R \in RN \times P$ be the features where $\tilde{x}_{i,p}$ is the $p^{th}$ feature of the $i^{th}$ sample. Let $\tilde{y} \in R^{\tilde{N}}$ be the unknown labels where $\tilde{y}_i \in \{1, 2, \ldots, K\}$ is the label of the $i^{th}$ sample, and $\tilde{c}$ be the prediction confidences of the prediction where $\tilde{c}_i$ is the confidence (likelihood) of the $i^{th}$ sample. $\tilde{y}, \tilde{c}$ are computed as follows:

$$\tilde{y}_i = \underset{k}{\mathrm{argmax}} \exp(\tilde{X}_{i,p}W_{p,k} + W_{P+1,k})$$

$$\tilde{c}_i = \frac{\exp(\tilde{X}_{i,p}W_{p,\tilde{y}_i} + W_{P+1,k})}{\sum_k \exp(\tilde{X}_{i,p}W_{p,k} + W_{P+1,k})}$$

FIG. 11A, for instance, shows two predicted features values L1, L3 for invoice feature INV.F1 when the feature model 522a for INV.F1 is applied to the feature values of credit memo CM #9001. Likewise, three predicted feature values L2, L1, L3 are produced for credit memo CM #9002 when feature model 522a is applied to the feature values of credit memo CM #9002, and so on for credit memos CM #9003 and CM #9004. FIG. 11B shows similar predicted feature values for invoice feature INV.F2, and FIG. 11C shows predicted feature values for invoice feature INV.F3.

The corresponding probability scores for each predicted value indicate the likelihood that a particular feature in an invoice that matches a given credit memo will have a certain value. Consider for example, credit memo CM #9001 shown in FIG. 11A. Feature INV.F1 of an invoice that matches credit memo CM #9001 is 40% probability to take on the value of L1 and a 60% probability to take on the value of L3.

It will be appreciated that other feature values and corresponding probabilities can be predicted. In some embodiments, a probability threshold can be applied to limit the number of predicted values to be considered; e.g., a threshold of 40% can be used so that only feature values having probabilities equal to or greater than 40% are considered.

The inference engine 214 can combine the predicted feature values generated for each invoice feature INV.F1, INV.F2, . . . INV.F3 for each received credit memo to generate a set of predicted invoices for that credit memo. In accordance with the present disclosure, every combination of feature values for every invoice feature can be produced. FIG. 12A, for example, shows a combination matrix 1202 that defines the set of predicted invoices for unmatched credit memo CM #9001, created using the predicted values for invoice features INV.F1, INV.F2, . . . INV.F3 shown respectively in FIGS. 11A, 11B, 11C. FIG. 12B likewise shows a combination matrix 1212 that defines the set of predicted invoices for unmatched credit memo CM #9002. FIG. 12C shows a combination matrix 1222 that defines the set of predicted invoices for unmatched credit memo CM #9003. FIG. 12D shows a combination matrix 1222 that defines the set of predicted invoices for unmatched credit memo CM #9004.

Operation 1008

Figure 13:
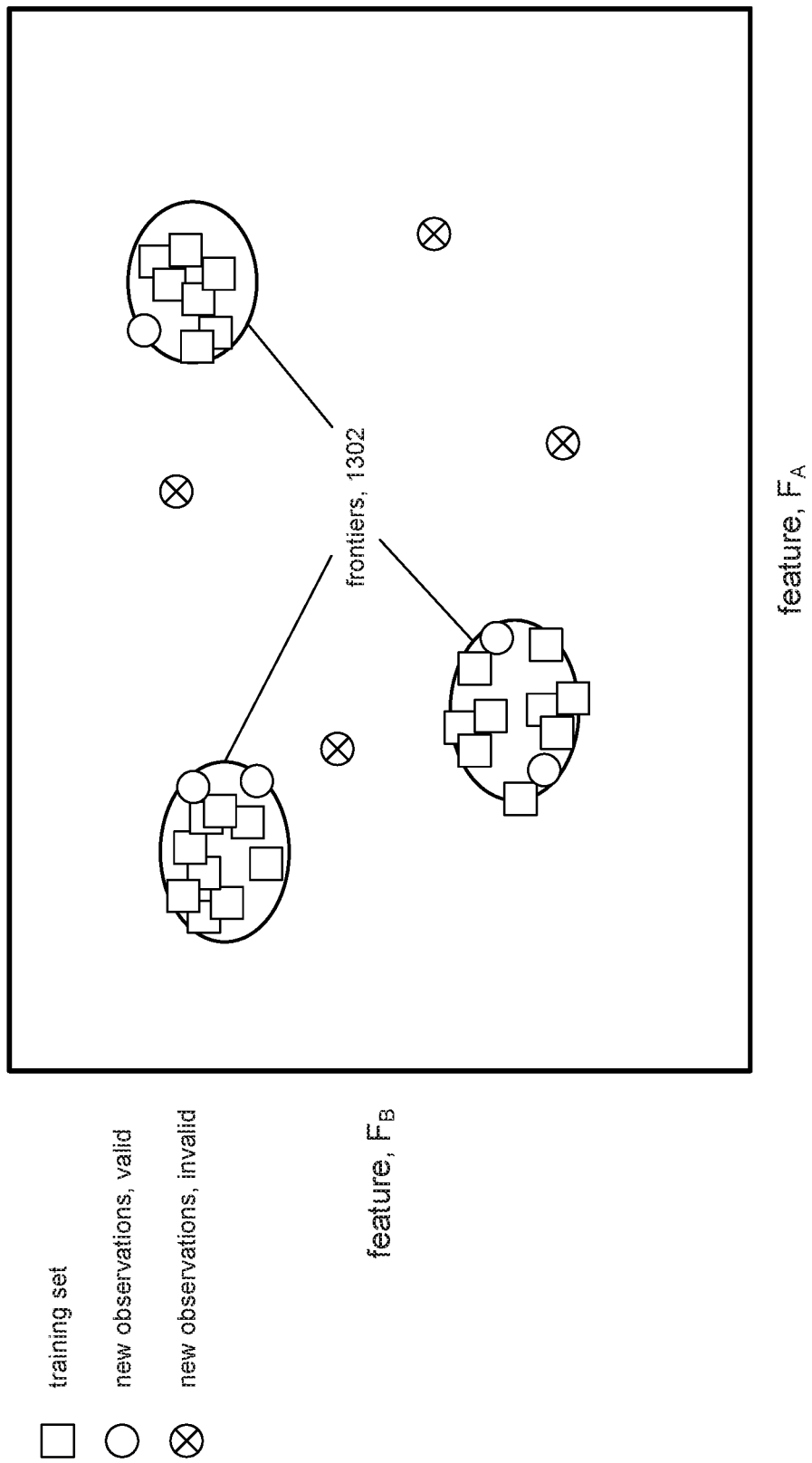
FIG. 13 is a highly simplified example of a constellation frontiers.

At operation 1008, inference engine 214 can identify a set of selector invoices (e.g., selector documents 236) for each of the unmatched credit memos from their corresponding set of predicted invoices. In accordance with the present disclosure, the all-features model 224 can be applied to the set of predicted invoices for a given credit memo to identify "valid" predicted invoices. The all-features model 224 defines one or more constellation frontiers from the features in its training set (e.g., 506). Referring for a moment to FIG. 13, a highly simplified example shows constellation frontiers 1302 that can be learned/defined by training a model such as the all-features model 224. In some embodiments, for example, the all-features model 224 can be a one-class support vector machine (SVM). The constellation frontiers 1302 can be defined by training the model with features $F_A$, $F_B$ of a training set. The constellation frontiers 1302 can be used to test new observations to determine whether they are alike or not like the training set. As shown in FIG. 13, a new observation (e.g., predicted invoice) can be assessed as being valid or invalid, based on whether it lies within a frontier 1302 (valid) or not (invalid).

FIG. 12A shows the set of predicted invoices that were generated for credit memo CM #9001 in operation 1006. The set of predicted invoices can be applied to the all-features model 224 in order to identify predicted invoices that fall outside of the constellation frontier(s) that were learned by training the all-features model 224 with training set 506; such invoices can be deemed to be invalid. Suppose for the remainder of the discussion, that the "valid" predicted invoices for credit memo CM #9001 are invoices 1204a, 1204b, 1204c.

FIG. 12B shows the set of predicted invoices that were generated at operation 1006 for credit memo CM #9002. Suppose for discussion purposes that predicted invoices 1214a, 1214b, 1214c are the valid invoices identified by the all-features model 224. Similarly, FIG. 12C shows valid predicted invoices 1224a, 1224b for credit memo CM #9003, and FIG. 12D shows valid predicted invoices 1234a, 1234b, 1234c for credit memo CM #9004. It can be appreciated that applying the all-features model 224 to the predicted invoices reduces the larger population of predicted invoices to a smaller set of valid predicted invoices. As will become clear, the smaller set of valid predicted invoices can improve performance of the search in operation 1010.

Operation 1010

Figure 14A:
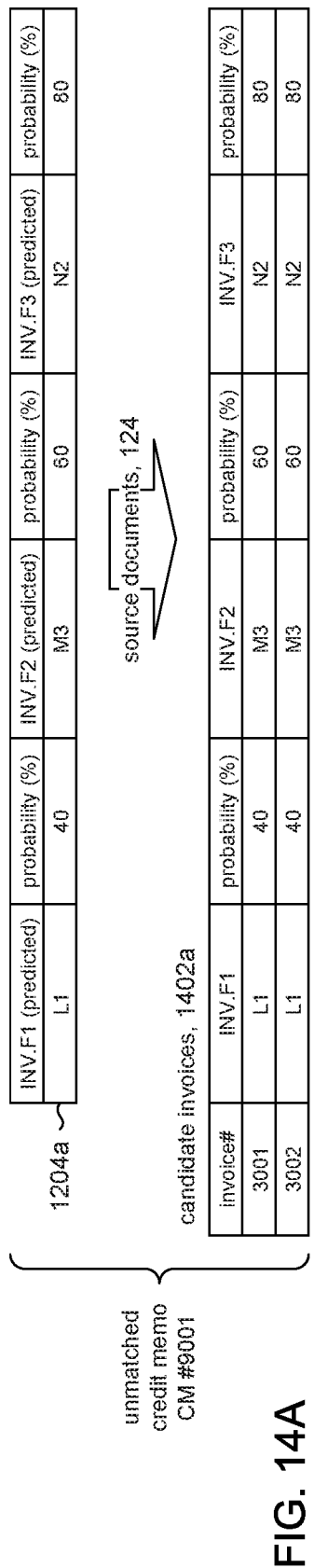
FIGS. 14A, 14B, 14C are examples of generating candidate invoices in accordance with some embodiments of the present disclosure.

At operation 1010, inference engine 214 can use the valid predicted invoices obtained at operation to select candidate invoices from the source documents 124 as candidates that match the credit memo. The valid predicted invoices can therefore be referred to as "selector invoices." In some embodiments, each selector invoice can be compared feature-by-feature with invoice documents stored among source documents 124 to identify candidate invoices. Referring to FIG. 14A, the figure shows a selector invoice 1204*a* for credit memo CM #9001 (FIG. 12A). The predicted values of each feature (INV.F1, INV.F2, INV.F3) in selector invoice 1204*a* can be compared with corresponding values in each invoice document in source documents 124. In some embodiments, the comparison can be an exact match comparison between feature values, and in other embodiments the comparison may not require an exact match between feature values. The example in FIG. 14A shows that the comparison has identified two candidate invoices 1402*a* (invoice #s 3001, 3002) from the source documents 124 whose feature values match the predicted values in the selector invoice 1204*a*. In accordance with the present disclosure, the probability scores associated with the predicted values from the selector invoices 1204*a* are carried over to the feature values in the candidate invoices 1402*a*.

Figure 14B:
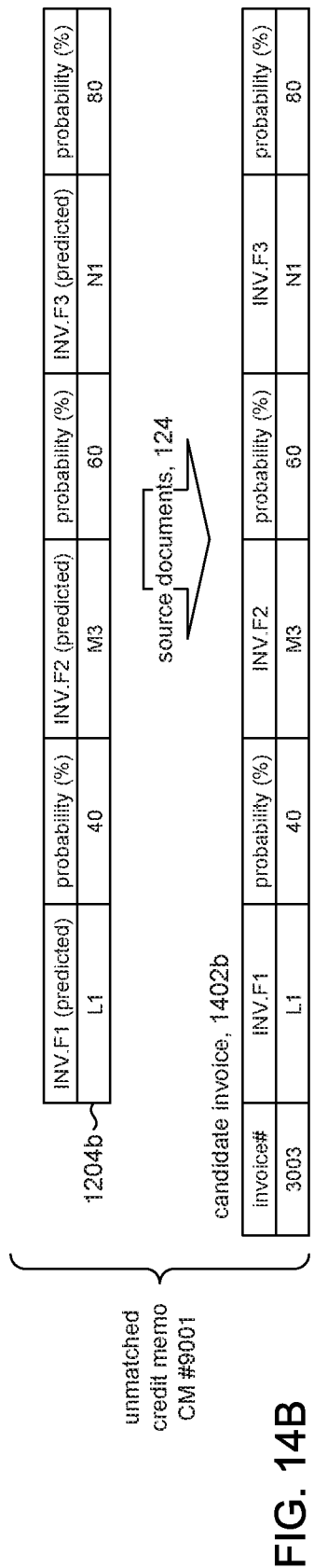
Figure 14C:
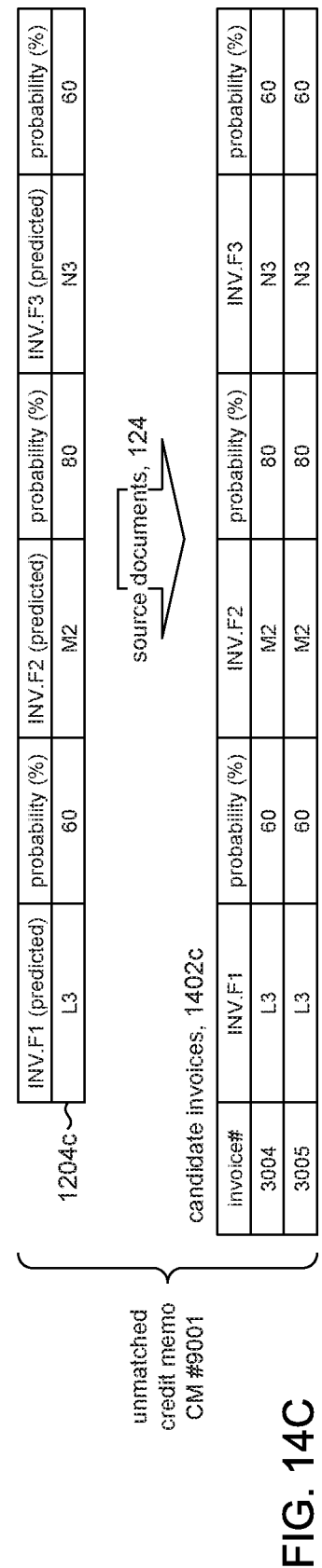

Recalling that three selector invoices 1204*a*, 1204*b*, 1204*c* were identified for credit memo CM #9001, FIG. 14B shows a candidate invoice 1402*b* identified from source documents 124 using selector invoice 1204*b* for credit memo CM #9001. FIG. 14C shows candidate invoices 1402*c* identified from source documents 124 using selector invoice 1204*c* for credit memo CM #9001. Although not shown, the selector invoices 1214*a*, 1214*b*, 1214*c* (FIG. 12B) for credit memo CM #9002 can be similarly processed to identify invoices from source documents 124 as candidates that match the credit memo, and likewise selector invoices 1224*a*, 1224*b* (FIG. 12C) for credit memo CM #9003 and selector invoices 1234*a*, 1234*b*, 1234*c* (FIG. 12D) for credit memo CM #9004.

FIG. 15 shows the resulting set of candidate invoices 1502 for credit memo CM #9001 and the resulting set of candidate invoices 1504 for credit memo CM #9002. FIG. 15 also shows examples of candidate invoices 1506 for credit memo CM #9003 and candidate invoices 1508 for credit memo CM #9004.

Operation 1012

At operation 1012, inference engine 214 can use k-means clustering to rank the candidate invoices. In predictive analysis, k-means clustering is a method of cluster analysis. The k-means algorithm partitions n observations or records into k clusters in which each observation belongs to the cluster with the nearest center. Clustering works to group records together according to an algorithm or mathematical formula that attempts to find centroids, or centers, around which similar records gravitate. K-means clustering uses all the probabilities from categorical features and similarities from continuous features as input to find out the centers, around which similar records gravitate. Given an initial set of k means $m_1, \ldots, m_k$, the algorithm proceeds by alternating between two steps:

1. Assignment step: assigns each observation to the cluster with the closest mean.
2. Update step: calculates the new means to be the center of the observations in the cluster.
3. The algorithm repeats until the assignments no longer change.

Referring back to FIG. 2 for a moment, continuous features in the candidate documents 236 generated by the candidate selector 226, such as price amount, quantity, customer name or customer address can be processed in the similarity scoring module 228. If such features from unmatched credit memo and candidate invoices are similar to each other, they should be considered as candidates with high ranking score. For example, suppose the customer name in an invoice is "Mr. John Smith" and in the credit memo the name is "Dr. John Smith". Both names are intended to refer to the same personal address but have different customer IDs. In some embodiments, an approximate matching algorithm (sometimes referred to as fuzzy matching) can be used to match a pattern approximately rather than exactly. Thus, "Mr. John Smith" in the credit memo compared against the string "Dr. John Smith" in the invoice can return an 85% similarity result. As another example, if the unit price of a product in both documents are similar, they should also be considered as candidates with high ranking score. In the example of a posting date, suppose we use the regression function to detect that the majority of credit memos were created within 15 days after delivery. The higher similarity of the invoice posting date distance, the higher ranking score this invoice should have. For each continuous features, we can use suitable technology to calculate the similarity percentage.

Figure 17:
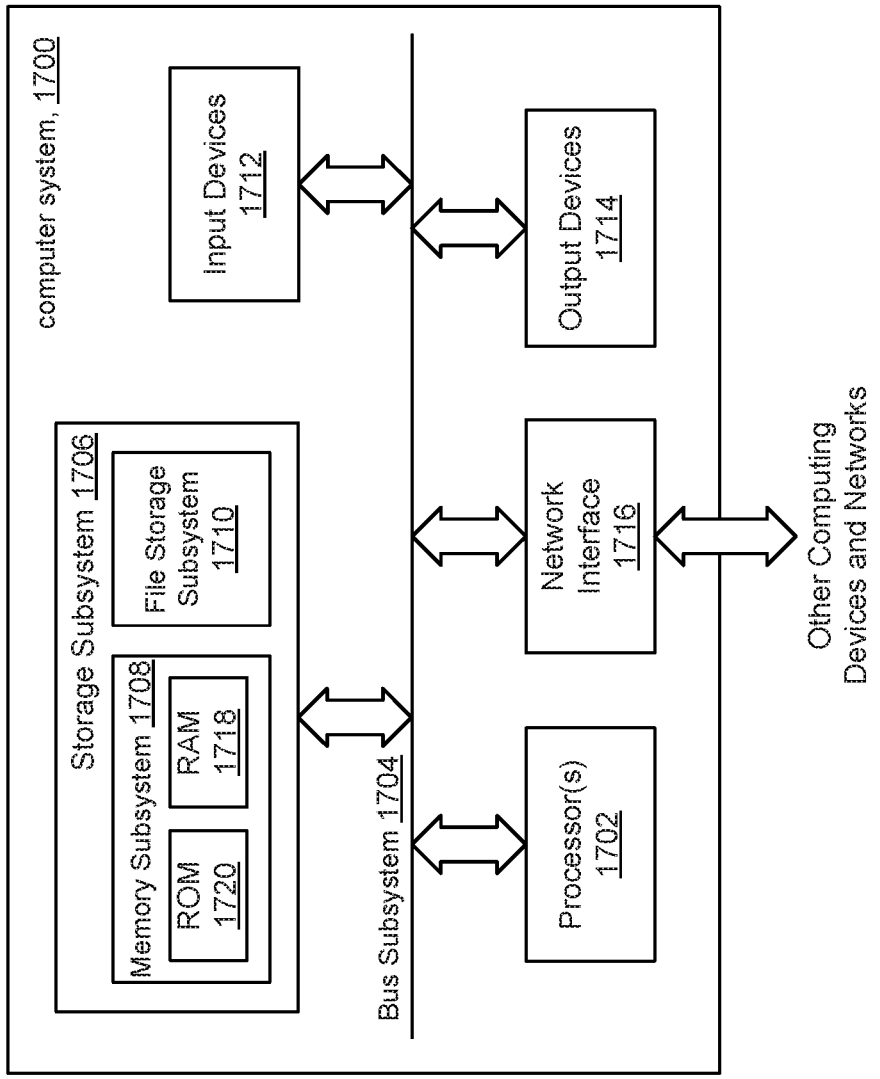
FIG. 17 is a high level diagram of a computer system in accordance with some embodiments of the present disclosure.

FIG. 17 depicts a simplified block diagram of an example computer system 1700 according to certain embodiments. Computer system 1700 can be used to implement the machine learning engine 212 and the inference engine 214 described in the present disclosure. As shown in FIG. 17, computer system 1700 includes one or more processors 1702 that communicate with a number of peripheral devices via bus subsystem 1704. These peripheral devices include storage subsystem 1706 (comprising memory subsystem 1708 and file storage subsystem 1710), user interface input devices 1712, user interface output devices 1714, and network interface subsystem 1716.

Bus subsystem 1704 can provide a mechanism for letting the various components and subsystems of computer system 1700 communicate with each other as intended. Although bus subsystem 1704 is shown schematically as a single bus, alternative embodiments of the bus subsystem can utilize multiple busses.

Network interface subsystem 1716 can serve as an interface for communicating data between computer system 1700 and other computer systems or networks. Embodiments of network interface subsystem 1716 can include, e.g., an Ethernet card, a Wi-Fi and/or cellular adapter, a modem (telephone, satellite, cable, ISDN, etc.), digital subscriber line (DSL) units, and/or the like.

User interface input devices 1712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1700.

User interface output devices 1714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1700.

Memory subsystem 1706 includes memory subsystem 1708 and file/disk storage subsystem 1710 represent non-transitory computer-readable storage media that can store program code and/or data, which when executed by processor 1702, can cause processor 1702 to perform operations in accordance with embodiments of the present disclosure.

Memory subsystem 1708 includes a number of memories including main random access memory (RAM) 1718 for storage of instructions and data during program execution and read-only memory (ROM) 1720 in which fixed instructions are stored. File storage subsystem 1710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1700 is illustrative and many other configurations having more or fewer components than system 1700 are possible.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for matching a document of a first kind to a document of a second kind, the method comprising:
   providing a plurality of feature models, each feature model in the plurality of feature models configured to generate predicted feature values for a feature in a plurality of features associated with the second kind of documents;
   providing an all-features model comprising a one-class support vector machine;
   receiving a document of the first kind to be matched with a document from a plurality of documents of the second kind;
   applying the plurality of feature models to the received document to produce a plurality of predicted documents of the second kind;
   applying the all-features model to the plurality of predicted documents to identify a plurality of selector documents from the plurality of predicted documents, the plurality of selector documents being specific ones of the plurality of predicted documents that are validated based on being within a cluster defined by the support vector machine;
   selecting a plurality of candidate documents from the plurality of documents of the second kind using the plurality of selector documents to identify the candidate documents; and
   selecting a document from the plurality of candidate documents as a matching document that is deemed to match the received document.

2. The method of claim 1, wherein to produce the plurality of predicted documents of the second kind comprises:
   generating a plurality of predicted feature values and associated probability scores for the features associated with the second kind of documents by applying the plurality of feature models to features associated with the received document; and
   combining the generated plurality of predicted feature values to produce the plurality of predicted documents of the second kind.

3. The method of claim 2, wherein the selecting includes ranking the plurality of candidate documents based on their features and respective associated probability scores.

4. The method of claim 3, wherein the ranking comprises computing a K-means probability for each candidate document from its features, respective associated probability scores, and associated similarity scores, wherein the matching document is selected based on computed K-means probabilities of the plurality of candidate documents.

5. The method of claim 1, further comprising training each feature model using a training set comprising training features and a training label, wherein the training features include features associated with the first kind of documents and the training label is one of the plurality of features associated with the second kind of documents.

6. The method of claim 1, further comprising training the all-feature model using a training set comprising training features and a training label, wherein the training features include features associated with the first kind of documents and the plurality of features associated with the second kind of documents and each training label is a YES label.

7. The method of claim 1, wherein each feature model is a multi- class classification model, wherein the all-features model is a one-class classification model.

8. A non-transitory computer-readable storage medium having stored thereon computer executable instructions, which when executed by a computer device, cause the computer device to:
   provide a plurality of feature models, each feature model in the plurality of feature models configured to generate predicted feature values for a feature in a plurality of features associated with the second kind of documents;
   provide an all-features model comprising a one-class support vector machine;
   receive a document of the first kind to be matched with a document from a plurality of documents of the second kind;
   apply the plurality of feature models to the received document to produce a plurality of predicted documents of the second kind;
   apply the all-features model to the plurality of predicted documents to identify a plurality of selector documents from the plurality of predicted documents, the plurality of selector documents being specific ones of the plurality of predicted documents that are validated based on being within a cluster defined by the support vector machine;
   select a plurality of candidate documents from the plurality of documents of the second kind using the plurality of selector documents to identify the candidate documents; and
   select a document from the plurality of candidate documents as a matching document that is deemed to match the received document.

9. The non-transitory computer-readable storage medium of claim 8, wherein to produce the plurality of predicted documents of the second kind comprises:
   generating a plurality of predicted feature values and associated probability scores for the features associated with the second kind of documents by applying the plurality of feature models to features associated with the received document; and
   combining the generated plurality of predicted feature values to produce the plurality of predicted documents of the second kind.

10. The non-transitory computer-readable storage medium of claim 9, wherein the selecting includes ranking the plurality of candidate documents based on their features, respective associated probability scores, and associated similarity scores.

11. The non-transitory computer-readable storage medium of claim 10, wherein the ranking comprises computing a K-means probability for each candidate document from its features, respective associated probability scores, and associated similarity scores, wherein the matching document is selected based on computed K-means probabilities of the plurality of candidate documents.

12. The non-transitory computer-readable storage medium of claim 8, wherein the computer executable instructions, which when executed by the computer device, further cause the computer device to train each feature model using a training set comprising training features and a training label, wherein the training features include features associated with the first kind of documents and the training label is one of the plurality of features associated with the second kind of documents.

13. The non-transitory computer-readable storage medium of claim 8, wherein the computer executable instructions, which when executed by the computer device, further cause the computer device to training the all-feature model using a training set comprising training features and a training label, wherein the training features include features associated with the first kind of documents and the plurality of features associated with the second kind of documents and each training label is a YES label.

14. The non-transitory computer-readable storage medium of claim 8, wherein each feature model is a multi-class classification model, wherein the all-features model is a one-class classification model.

15. An apparatus comprising:
one or more computer processors; and
a computer-readable storage medium comprising instructions for controlling the one or more computer processors to be operable to:
provide a plurality of feature models, each feature model in the plurality of feature models configured to generate predicted feature values for a feature in a plurality of features associated with the second kind of documents;
provide an all-features model comprising a one-class support vector machine;
receive a document of the first kind to be matched with a document from a plurality of documents of the second kind;
apply the plurality of feature models to the received document to produce a plurality of predicted documents of the second kind;
apply the all-features model to the plurality of predicted documents to identify a plurality of selector documents from the plurality of predicted documents, the plurality of selector documents being specific ones of the plurality of predicted documents that are validated based on being within a cluster defined by the support vector machine;
select a plurality of candidate documents from the plurality of documents of the second kind using the plurality of selector documents to identify the candidate documents; and
select a document from the plurality of candidate documents as a matching document that is deemed to match the received document.

16. The apparatus of claim 15, wherein the computer-readable storage medium further comprises instructions for controlling the one or more computer processors to be operable to:
generate a plurality of predicted feature values and associated probability scores for the features associated with the second kind of documents by applying the plurality of feature models to features associated with the received document; and
combine the generated plurality of predicted feature values to produce the plurality of predicted documents of the second kind.

17. The apparatus of claim 16, wherein the selecting includes ranking the plurality of candidate documents based on their features, respective associated probability scores, and associated similarity scores.

18. The apparatus of claim 15, wherein the computer executable instructions, which when executed by the computer device, further cause the computer device to train each feature model using a training set comprising training features and a training label, wherein the training features include features associated with the first kind of documents and the training label is one of the plurality of features associated with the second kind of documents.

19. The apparatus of claim 15, wherein the computer executable instructions, which when executed by the computer device, further cause the computer device to training the all-feature model using a training set comprising training features and a training label, wherein the training features include features associated with the first kind of documents and the plurality of features associated with the second kind of documents and each training label is a YES label.

20. The apparatus of claim 15, wherein each feature model is a multi-class classification model, wherein the all-features model is a one-class classification model.

* * * * *